(12) United States Patent
Sakamoto et al.

(10) Patent No.: US 6,281,284 B1
(45) Date of Patent: Aug. 28, 2001

(54) ANTIBACTERIAL, MILDEW RESISTANT ORGANOPOLYSILOXANE COMPOSITIONS

(75) Inventors: Takafumi Sakamoto; Tokuo Sato, both of Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/523,220

(22) Filed: Mar. 10, 2000

(30) Foreign Application Priority Data

Mar. 10, 1999 (JP) .................................................. 11-063172

(51) Int. Cl.⁷ .................................. C08K 3/00; C08K 3/22
(52) U.S. Cl. ........................ 524/785; 523/122; 524/435; 524/106; 524/588; 528/19; 528/34
(58) Field of Search ............................ 523/122; 524/435, 524/588, 106, 785; 528/19, 34

(56) References Cited

U.S. PATENT DOCUMENTS

| | | |
|---|---|---|
| 4,247,442 | 1/1981 | Shimizu . |
| 5,705,587 * | 1/1998 | Hatanaka et al. . |
| 5,733,995 * | 3/1998 | Kimura et al. . |
| 6,008,290 | 12/1999 | Miyoshi et al. . |
| 6,121,298 * | 9/2000 | Sakamoto et al. . |

FOREIGN PATENT DOCUMENTS

| | | |
|---|---|---|
| 51-106158 | 9/1976 | (JP) . |
| 56-38348 | 4/1981 | (JP) . |
| 1-242665 * | 9/1989 | (JP) . |
| 7076654 | 3/1995 | (JP) . |
| 9-143009 * | 6/1997 | (JP) . |

\* cited by examiner

*Primary Examiner*—Robert Dawson
*Assistant Examiner*—Marc S. Zimmer

(57) ABSTRACT

An organopolysiloxane composition comprising (A) an organopolysiloxane, (B) a silane compound having at least two hydrolyzable groups or a partial hydrolyzate thereof, and (C) an antibacterial agent based on a ferrous compound, typically $FeSO_4$ is antibacterial, mildew resistant, resistant to heat, resistant to weather, and safe.

5 Claims, No Drawings

ANTIBACTERIAL, MILDEW RESISTANT ORGANOPOLYSILOXANE COMPOSITIONS

This invention generally relates to antibacterial, mildew resistant organopolysiloxane compositions.

BACKGROUND OF THE INVENTION

RTV silicone rubbers which have crosslinked in the presence of moisture are easy to handle and have improved weathering and electrical properties. On account of these advantages, they find use in a variety of applications, for example, as sealants for plumbing fixtures (in kitchens and bathrooms), sealing materials in building and construction fields, and adhesives in electric and electronic fields. Among others, oxime-elimination type RTV silicone rubbers are utilized in a wider variety of applications since they remain firmly bonded to various members in wet conditions and are fully weather resistant.

As the house building technology improves these years, houses become more air-tight. Moist places in such houses are good habitats for microorganisms such as bacteria and mildew (fungi). Especially, fungi often grow on RTV silicon rubber while extending their hypha into the rubber interior. The resulting mildew is difficult to wipe off and remove even with chemical agents, detracting from the outer appearance of rubber.

One effective solution is to incorporate antibacterial agents into sealing materials. Illustrative known approaches taken for silicone sealing materials from the antibacterial and safety standpoints include the addition of 2,3,5,6-tetrachloro-4-methylsulfonylpyridine. 2-(4-thiazolyl) benzimidazole and N-substituted benzimidazolyl carbamate derivatives as disclosed in JP-A 51-106158, U.S. Pat. No. 4,247,442, and JP-A 56-38348, respectively. Sealing materials containing these compounds, however, will yellow upon application of heat or exposure to UV radiation. This yellowing problem prevents the amount of such antibacterial agents added from being increased to such an extent as to be effective for controlling the growth of all species of fungi.

U.S. Pat. No. 6,008,290 discloses an organopolysiloxane composition comprising a triazolyl group-bearing mildewstat. This composition is fully mildew resistant, but insufficiently antibacterial.

Also, JP-A 7-76654 discloses the combined use of an organic mildewstat and an inorganic antibacterial agent. This combination is effective for controlling bacteria and mildew, but unsatisfactory with respect to discoloring.

In connection with the problem of colon bacterium O-157 and the recent development and marketing of antibacterial products such as floors and sanitary ware treated to be antibacterial, the sealing materials used in such products are also required to be antibacterial.

There is a strong desire to have a sealing material which is endowed with high antibacterial and mildew resistant properties without a loss of quality such as discoloration, while maintaining safety.

SUMMARY OF THE INVENTION

An object of the invention is to provide an antibacterial, mildew resistant organopolysiloxane composition which is antibacterial, mildew resistant, resistant to heat, weather inclusive of UV, and discoloration, and safe.

The inventor has found that an organopolysiloxane composition obtained by blending an organopolysiloxane of the general formula (1) or (2) to be shown below with a silane compound having at least two hydrolyzable groups each attached to a silicon atom in a molecule or a partial hydrolyzate thereof and an antibacterial agent based on a ferrous compound will fast cure at room temperature into a silicone rubber which is antibacterial, mildew resistant, resistant to heat, weather inclusive of UV, and discoloration, and safe. When a triazole group-bearing compound is additionally blended, the organopolysiloxane composition is further improved in antibacterial and mildew resistant properties.

The inventor has found that an iron (II) compound is effective for controlling bacteria and mildew (fungi), and that when an antibacterial agent based on an iron (II) compound is blended in an organopolysiloxane composition comprising an organopolysiloxane of the general formula (1) or (2) and a silane compound having at least two hydrolyzable groups in a molecule or a partial hydrolyzate thereof, there is obtained a silicone rubber of quality which is antibacterial, mildew resistant, and resistant to weather, and eliminates the discoloration and hazard problems.

Accordingly, the invention provides an antibacterial, mildew resistant organopolysiloxane composition comprising (A) 100 parts by weight of an organopolysiloxane of the following general formula (1) or (2), (B) 0.1 to 30 parts by weight of a silane compound having at least two hydrolyzable groups each attached to a silicon atom in a molecule or a partial hydrolyzate thereof, and (C) 0.1 to 20 parts by weight of an antibacterial agent based on a ferrous compound.

$$HO(SiR^1_2O)_nH \tag{1}$$

$R^1$ is independently a substituted or unsubstituted monovalent hydrocarbon group of 1 to 10 carbon atoms, and n is an integer of at least 10.

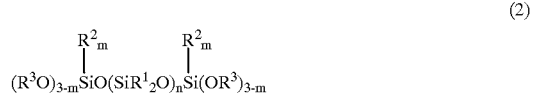

$$(R^3O)_{3-m}SiO(SiR^1_2O)_nSi(OR^3)_{3-m} \tag{2}$$

$R^1$ and n are as defined above, $R^2$ is a substituted or unsubstituted monovalent hydrocarbon group of 1 to 10 carbon atoms, $R^3$ is a monovalent hydrocarbon group of 1 to 6 carbon atoms, and m is equal to 0 or 1.

DESCRIPTION OF THE PREFERRED EMBODIMENTS

Component (A) of the antibacterial, mildew resistant organopolysiloxane composition according to the invention is an organopolysiloxane of the following general formula (1) or (2).

$$HO(SiR^1_2O)_nH \tag{1}$$

In formula (1), $R^1$ is independently selected from substituted or unsubstituted monovalent hydrocarbon groups of 1 to 10 carbon atoms, for example, alkyl groups such as methyl, ethyl, propyl, butyl, hexyl and octyl; cycloalkyl groups such as cyclohexyl; alkenyl groups such as vinyl, allyl, propenyl, butenyl and hexenyl; aryl groups such as phenyl and tolyl; aralkyl groups such as benzyl and phenylethyl; and substituted ones of these groups in which some of the hydrogen atoms are replaced by halogen atoms (e.g., chlorine, fluorine and bromine), such as trifluoropropyl. Methyl is most preferred. $R^1$ groups may be identical or different. The letter n is an integer of at least 10 and preferably such an integer that the organopolysiloxane may have a viscosity of about 25 to about 500,000 centistokes (cSt) at 25° C., and especially about 100 to 100,000 cSt at 25° C.

$$(R^3O)_{3-m}\overset{R^2_m}{\underset{|}{Si}}O(SiR^1{}_2O)_n\overset{R^2_m}{\underset{|}{Si}}(OR^3)_{3-m} \quad (2)$$

In formula (2), $R^1$ and n are as defined above. $R^2$ is a substituted or unsubstituted monovalent hydrocarbon group of 1 to 10 carbon atoms, examples of which are as listed above for $R^1$. $R^3$ is a monovalent hydrocarbon group of 1 to 6 carbon atoms, examples of which are as listed above for $R^1$, preferably an unsubstituted one, and more preferably an alkyl group such as methyl. The letter m is equal to 0 or 1.

Component (B) is a silane compound having at least two hydrolyzable groups, such as ketoxime, alkoxy or alkenoxy groups, each attached to a silicon atom in a molecule or a partial hydrolyzate thereof.

The preferred silane compounds used herein are ketoximesilanes and alkoxysilanes. Most preferred are silane compounds having ketoxime groups represented by the following general formula (3):

$$R^5{}_aSi(ON=CR^4{}_2)_{4-a} \quad (3)$$

wherein $R^4$ is independently a substituted or unsubstituted monovalent hydrocarbon group of 1 to 10 carbon atoms, $R^5$ is an unsubstituted monovalent hydrocarbon group of 1 to 10 carbon atoms, and a is equal to 0, 1 or 2.

Examples of the group represented by $R^4$ are as listed above for $R^1$. $R^4$ groups may be identical or different. Examples of the group represented by $R^5$ are unsubstituted ones among those listed above for $R^1$.

Illustrative examples of the hydrolyzable silane compound (B) include methyltris(dimethylketoxime)silane, methyltris(methylethylketoxime)silane, ethyltris(methylethylketoxime)silane, methyltris(methylisobutylketoxime)silane, vinyltris(methylethylketoxime)silane, vinyltris(dimethylketoxime)silane, phenyltris(methylethylketoxime)silane, and phenyltris(dimethylketoxime)silane, which fall in the ketoximesilanes of formula (3). Other exemplary silanes are methyltrimethoxysilane, methyltriacetoxysilane, methyltriisopropenoxysilane, vinyltrimethoxysilane, vinyltri(2-methoxyethoxy)silane, and vinyltriacetoxysilane. These silanes may be used alone or in admixture of two or more.

The silane compound or a partial hydrolyzate thereof is used in an amount of 0.1 to 30 parts, and preferably 1 to 15 parts by weight per 100 parts by weight of the organopolysiloxane (A). Less amounts of the silane compound fail to achieve sufficient crossliking and to form a rubber with the desired elasticity. Excessive amounts of the silane compound lead to poor mechanical properties.

Component (C) is an antibacterial agent based on a ferrous compound, which is crucial for the present invention. Exemplary iron (II) compounds are $FeSO_4$, $Fe(OH)_2$ and FeS, with ferrous sulfate being preferred. The antibacterial agent (C) may be a ferrous compound in admixture with silica, titanium oxide, zinc oxide, calcium carbonate, aluminum hydroxide, and zeolite.

The antibacterial agent based on a ferrous compound is commercially available under the trade name of Efunica series from Nanyo Efunica K.K.

The antibacterial agent is used in an amount of 0.1 to 20 parts, and preferably 0.5 to 10 parts by weight per 100 parts by weight of the organopolysiloxane (A). Less amounts of the antibacterial agent are ineffective. Excessive amounts of the antibacterial agent achieve no further effect and can rather detract from the workability of sealants.

In the composition of the invention, a commonly used mildew resistant agent is preferably blended in addition to the above-described essential components because the combined use of another mildew resistant agent adds to the antibacterial and mildew resistant effects.

The other mildew resistant agent is preferably a triazole group-bearing compound of the following general formula (4):

$$Y-CR^6R^7-CR^8R^9-X \quad (4)$$

wherein $R^6$ and $R^7$ are independently hydrogen or substituted or unsubstituted monovalent hydrocarbon groups, $R^8$ and $R^9$ are independently alkoxy groups, hydrogen or alkyl groups, Y is a hydroxyl or nitrile group, and X is a triazolyl group.

More particularly, the monovalent hydrocarbon groups represented by $R^6$ and $R^7$ are preferably those of 1 to 12 carbon atoms, examples of which are as listed above for $R^1$. The alkoxy groups represented by $R^8$ and $R^9$ are preferably those of 1 to 12 carbon atoms which may include biphenylalkoxy, and the alkyl groups represented by $R^8$ and $R^9$ are preferably those of 1 to 12 carbon atoms.

Of the triazole-bearing compounds of formula (4), 1,2,4-triazol-1-yl group-bearing compounds are desirable. Examples include α-[2-(4-chlorophenyl)ethyl]-α-(1,1-dimethylethyl)-1H-1,2,4-triazol-1-yl-ethanol (tebuconazole), hexaconazole, and microbutanyl, with α-[2-(4-chlorophenyl)ethyl]-α-(1,1-dimethylethyl)-1H-1,2,4-triazol-1-yl-ethanol (tebuconazole) being preferred.

The triazole-bearing compound is used in an amount of 0.1 to 5 parts, and preferably 0.2 to 3 parts by weight per 100 parts by weight of the organopolysiloxane (A). Less amounts of the triazole-bearing compound may be ineffective. Excessive amounts of the triazole-bearing compound may achieve no further effect and can rather detract from discoloration resistance.

As long as the benefits of the invention are not impaired, antibacterial agents and mildew resistant agents other than the above-defined agents may be used.

In addition to the above-described components, the organopolysiloxane composition of the invention may further contain optional components, for example, well-known fillers, additives and catalysts, insofar as the benefits of the invention are not impaired. Exemplary fillers include ground silica, fumed silica, calcium carbonate, zinc carbonate, and wet silica. Exemplary additives include thixotropy modifiers such as polyethers and dimethylsilicone fluid blocked with a trimethylsilyl group at each end, and adhesive aids, e.g., aminosilanes such as γ-aminopropyl-triethoxysilane and 3-(2-aminoethyl)aminopropyltrimethoxysilane and epoxysilanes such as γ-glycidylpropyltrimethoxysilane and β-(3,4-epoxycyclohexyl)ethyltrimethoxysilane. Exemplary catalysts include organic tin catalysts such as organic tin esters and organic tin chelates, and organic titanium catalysts such as alkoxytitanium, organic titanates, and organic titanium chelates. An appropriate amount of the catalyst added is 0.01 to 10 parts by weight per 100 parts by weight of the organopolysiloxane (A). These optional components may be added in ordinary amounts insofar as the benefits of the invention are not impaired.

The antibacterial, mildew resistant organopolysiloxane composition can be prepared by mixing the essential and optional components in a conventional manner. It will fast cure at room temperature in the presence of moisture into a molded rubber part.

EXAMPLE

Examples of the invention are given below by way of illustration and not by way of limitation. All parts are by weight.

Example 1

To 80 parts of a polydimethylsiloxane I end-capped with a silanol group having a viscosity of 20,000 cSt at 25° C. were added 1 part of a $FeSO_4$ base antibacterial agent Efunica P601 (Nanyo Efunica K.K.) and 10 parts of fumed silica surface treated with dimethyldichlorosilane. Following agitation and mixing in a mixer, 6 parts of methyltributanoximesilane and 0.1 part of dibutyltin dioctate were added to the mixture, which was thoroughly mixed in vacuum. Further, 1 part of γ-aminopropyltriethoxysilane was added to the mixture, which was thoroughly mixed in vacuum, yielding sample No. 1.

Example 2

To 80 parts of the polydimethylsiloxane I end-capped with a silanol group having a viscosity of 20,000 cSt at 25° C. were added 1 part of an Efunica antibacterial, mildew resistant deodorant powder (Nanyo Efunica K.K.) and 10 parts of fumed silica surface treated with dimethyldichlorosilane. Following agitation and mixing in a mixer, 6 parts of methyltributanoximesilane and 0.1 part of dibutyltin dioctate were added to the mixture, which was thoroughly mixed in vacuum. Further, 1 part of γ-aminopropyltriethoxysilane was added to the mixture, which was thoroughly mixed in vacuum, yielding sample No. 2.

Example 3

To 80 parts of a polydimethylsiloxane II end-capped with a trimethoxysilyl group having a viscosity of 20,000 cSt at 25° C. were added 1 part of Efunica P601 and 10 parts of fumed silica surface treated with dimethyldichlorosilane. Following agitation and mixing in a mixer, 6 parts of methyltrimethoxysilane and 0.5 part of tetrabutoxytitanium were added to the mixture, which was thoroughly mixed in vacuum. Further, 1 part of γ-aminopropyltriethoxysilane and 0.5 part of tebuconazole were added to the mixture, which was thoroughly mixed in vacuum, yielding sample No. 3.

Comparative Example 1

To 80 parts of the polydimethylsiloxane I end-capped with a silanol group having a viscosity of 20,000 cSt at 25° C. was added 10 parts of fumed silica surface treated with dimethyldichlorosilane. Following agitation and mixing in a mixer, 6 parts of methyltributanoximesilane and 0.1 part of dibutyltin dioctate were added to the mixture, which was thoroughly mixed in vacuum. Further, 1 part of γ-aminopropyltriethoxysilane and 0.5 part of tebuconazole were added to the mixture, which was thoroughly mixed in vacuum, yielding sample No. 4.

Comparative Example 2

To 80 parts of the polydimethylsiloxane I end-capped with a silanol group having a viscosity of 20,000 cSt at 25° C. was added 10 parts of fumed silica surface treated with dimethyldichlorosilane. Following agitation and mixing in a mixer, 6 parts of methyltributanoximesilane and 0.1 part of dibutyltin dioctate were added to the mixture, which was thoroughly mixed in vacuum. Further, 1 part of γ-aminopropyltriethoxysilane and 1.0 part of silver ion-carrying ceramic antibacterial agent Zeomic (Shinanen K.K.) were added to the mixture, which was thoroughly mixed in vacuum, yielding sample No. 5.

The compositions of sample Nos. 1 to 5 in the foregoing Examples and Comparative Examples are shown in Table 1. Amounts are parts by weight.

Sample Nos. 1 to 5 in the foregoing Examples and Comparative Examples were molded into sheets of 2 mm thick, which were cured by holding for one week in an atmosphere of 20±3° C. and RH 55±10%. The cured sheets were subject to a discoloration test, mildew-proofing test and antibacterial test by the following procedures. The results are shown in Table 2.

Discoloration Test
(1) Heat Discoloration Test

The cured sheet was initially measured for color difference by means of a differential colorimeter CR-300 by Minolta Camera K.K. It was held for 200 hours in a dryer at 90° C. The aged sample was measured again for color difference. A yellowing factor (Δb) was calculated therefrom. The greater the value of Δb, the more discolored was the sheet.

(2) UV Discoloration Test

The cured sheet was initially measured for color difference by means of a differential calorimeter CR-300 by Minolta Camera K.K. It was exposed for 24 hours to UV radiation from a medical germicidal lamp spaced 10 cm from the sheet. The UV-exposed sample was measured again for color difference. A yellowing factor (ΔL) was calculated therefrom.

Mildew Resistant Test
(1) JIS Test

The cured sheet was tested according to JIS Z 2911. A predetermined amount of mildew (fungi) was applied to a sample, which was allowed to stand for a predetermined period of time. The growth of fungal hyphae was observed. Mildew resistance was evaluated as follows.

Rating 1: Fungal hyphae grew to cover an area of more than ⅓ of the entire specimen surface.

Rating 2: Fungal hyphae grew to cover an area of less than ⅓ of the entire specimen surface.

Rating 3: No growth of fungal hyphae was observed.

(2) MIL Test

This test follows MIL STD 810D Method 508.3 modification. Evaluation was made according to the following criterion.

| Rating | Fungus growth | Observation |
|---|---|---|
| 0 | no growth | no growth of fungi is observed |
| 1 | slight growth | sparse or limited growth of fungi is observed |
| 2 | some growth | local fungus distribution or some colonies are observed on the specimen surface |
| 3 | moderate growth | fungi grow and propagate to a substantial extent to induce changes of chemical or physical properties of the specimen material |
| 4 | noticeable propagation | enormous fungi propagate to cause deformation and decomposition of the specimen material |

Antibacterial Performance Test

The cured sheet was examined by an antibacterial test according to Antibacterial Society Test Method (film contact method, 1995). The bacteria used were *Staphylococcus aureus* and colon bacteria (Escherichia). Provided that A is a reference area immediately after bacteria inoculation, B is a reference area, C is a non-processed test area, and D is a sample, an increment/decrement value was calculated as {log(C/A)−log(D/A)}=log(C/D).

The specimen was determined effective (−) when the increment/decrement value is 2 or greater and ineffective (+) when the increment/decrement value is less than 2.

TABLE 1

| Composition (pbw) | E1 | E2 | E3 | CE1 | CE2 |
|---|---|---|---|---|---|
| Polydimethylsiloxane I | 80 | 80 | − | 80 | 80 |
| Polydimethylsiloxane II | − | − | 80 | − | − |
| Fumed silica | 10 | 10 | 10 | 10 | 10 |
| Efunica P601 | 1 | − | 1 | − | − |
| Efunica antibacterial, mildewproof, deodorant powder | − | 1 | − | − | − |
| Methyltributanoximesilane | 6 | 6 | − | 6 | 6 |
| Methyltrimethoxysilane | − | − | 6 | − | − |
| Dibutyltin dioctate | 0.1 | 0.1 | − | 0.1 | 0.1 |
| Tetrabutoxytitanium | − | − | 0.5 | − | − |
| γ-aminopropyltriethoxysilane | 1.0 | 1.0 | 1.0 | 1.0 | 1.0 |
| Tebuconazole | − | − | 0.5 | 0.5 | − |
| Zeomic | − | − | − | − | 5.0 |

TABLE 2

| | E1 | E2 | E3 | CE1 | CE2 |
|---|---|---|---|---|---|
| Heat discoloration | 2.9 | 2.1 | 3.0 | 2.2 | 3.8 |
| UV discoloration | 2.1 | 1.6 | 2.4 | 2.1 | 10.2 |
| Mildew resistance (JIS Z 2911) | 3 | 3 | 3 | 3 | 1 |
| Mildew resistance (MIL) | 1 | 1 | 0 | 1 | 3 |
| Antibacterial test (*Staphylococcus aureus*) | − | − | − | + | − |
| Antibacterial test (colon bacteria) | − | − | − | + | + |

There has been described an antibacterial, mildew resistant organopolysiloxane composition that cures into a silicone rubber which is fully antibacterial and mildew resistant, has satisfactory heat resistance, weather resistance inclusive of UV resistance, and resistance to discoloration, and is substantially non-harmful to the human. The rubber finds use in a variety of applications, for example, as sealants for plumbing fixtures, sealing materials in building and construction fields, and adhesives in electric and electronic fields.

Japanese Patent Application No. 11-063172 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. An antibacterial, mildew resistant organopolysiloxane composition comprising (A) 100 parts by weight of an organopolysiloxane of the following general formula (1) or (2):

$$HO(SiR^1_2O)_nH \qquad (1)$$

wherein $R^1$ is independently a substituted or unsubstituted monovalent hydrocarbon group of 1 to 10 carbon atoms, and n is an integer of at least 10, or $$(R^3O)_{3-m}\overset{R^2_m}{\underset{|}{Si}}O(SiR^1_2O)_n\overset{R^2_m}{\underset{|}{Si}}(OR^3)_{3-m} \qquad (2)$$

wherein $R^1$ and n are as defined above, $R^2$ is a substituted or unsubstituted monovalent hydrocarbon group of 1 to 10 carbon atoms, $R^3$ is a monovalent hydrocarbon group of 1 to 6 carbon atoms, and m is equal to 0 or 1, (B) 0.1 to 30 parts by weight of a silane compound having at least two hydrolyzable groups each attached to a silicon atom in a molecule or a partial hydrolyzate thereof, and (C) 0.1 to 20 parts by weight of an antibacterial agent based on a ferrous compound.

2. The composition of claim 1 wherein the silane compound component (B) is an alkoxysilane or ketoximesilane.

3. The composition of claim 1 wherein the silane compound partial hydrolyzate thereof (B) is a silane compound having ketoxime groups represented by the following general formula (3):

$$R^5_aSi(ON=CR^4_2)_{4-a} \qquad (3)$$

wherein $R^4$ is independently a substituted or unsubstituted monovalent hydrocarbon group of 1 to 10 carbon atoms, $R^5$ is an unsubstituted monovalent hydrocarbon group of 1 to 10 carbon atoms, and a is equal to 0, 1 or 2.

4. The composition of claim 1 wherein the antibacterial agent (C) is comprised of $FeSO_4$.

5. The composition of claim 1, further comprising 0.1 to 5 parts by weight of a triazole group-bearing compound of the following general formula (4):

$$Y-CR^6R^7-CR^8R^9-X \qquad (4)$$

wherein $R^6$ and $R^7$ are independently hydrogen or substituted or unsubstituted monovalent hydrocarbon groups, $R^8$ and $R^9$ are independently alkoxy groups, hydrogen or alkyl groups, Y is a hydroxyl or nitrile group, and X is a triazolyl group.

* * * * *